United States Patent [19]

Bandyopadhyay et al.

[11] Patent Number: 5,030,397
[45] Date of Patent: Jul. 9, 1991

[54] METHOD OF MAKING LARGE CROSS SECTION INJECTION MOLDED OR SLIP CAST CERAMICS SHAPES

[75] Inventors: Gautam Bandyopadhyay, Acton; Sheldon Lieberman, Burlington, both of Mass.; Kenneth French, Merrimack, N.H.

[73] Assignee: GTE Laboratories Incorporated, Waltham, Mass.

[21] Appl. No.: 473,267

[22] Filed: Jan. 31, 1990

Related U.S. Application Data

[63] Continuation-in-part of Ser. No. 848,199, Apr. 4, 1986, abandoned.

[51] Int. Cl.$^5$ .............................................. C04B 33/32
[52] U.S. Cl. ........................................ 264/63; 264/86; 264/328.2; 501/95
[58] Field of Search ....................... 264/63, 86, 328.2; 501/93, 95

[56] References Cited

U.S. PATENT DOCUMENTS

| | | | |
|---|---|---|---|
| 2,939,199 | 6/1958 | Strivens | 264/63 |
| 3,234,308 | 2/1966 | Hermann | 264/63 |
| 3,882,210 | 5/1975 | Crossley et al. | 264/63 |
| 4,144,207 | 3/1979 | Ohnsorg | 260/235 |
| 4,248,813 | 2/1981 | Hattori | 264/62 |
| 4,283,360 | 8/1981 | Henmi | 264/63 |
| 4,460,527 | 7/1984 | Kato | 264/56 |
| 4,507,224 | 3/1985 | Toibana et al. | 252/516 |
| 4,530,875 | 7/1985 | Donomoto | 428/283 |
| 4,533,345 | 9/1985 | Wei | 501/95 |
| 4,558,016 | 12/1985 | Bronson et al. | 501/95 |
| 4,569,886 | 2/1986 | Divecha | 428/379 |
| 4,579,699 | 4/1986 | Verzemnieks | 264/43 |
| 4,585,500 | 4/1986 | Minjolle et al. | 156/89 |

FOREIGN PATENT DOCUMENTS

| | | |
|---|---|---|
| 0032403 | 7/1981 | European Pat. Off. |
| 92180 | 7/1981 | Japan |
| 95640 | 6/1983 | Japan |
| 120406 | 7/1984 | Japan |
| 59-137366 | 8/1984 | Japan |

OTHER PUBLICATIONS

J. A. Mungels, Development of Injection Molded Reaction Bonded $Si_3N_4$, Ceramics for High Performance Applications-II, Proc. of 5th Army Mat'l Tech. Confer., Mar. 21-25, 1977, pp. 113-130.

T. J. Whalen, J. E. Noakes and L. L. Terner, Progress on Injection-Molded Reaction-Bonded SiC, Ceramics for High Performance Applications-II, Proc. of 5th Army Mat'l Tech. Confer., Mar. 21-25, 1977, pp. 179-189.

G. D. Schnittgrund, Injection Molded Ceramic Rocket Engine Components, SAMPE, Quarterly, Jul. 1987, p. 873.

C. L. Quachenbush et al., Fabrication of Sinterable Silicon Nitride by Injection Molding, 19th Summary Report, ATD Contractors Coor. Mtg., Oct. 26-29, 1981, pp. 424-437.

G. Bandyopadhyay, Injection Molded Silicon Nitride for Engine Applications: Fabrication and Properties, Proc. of the 21st ATD Contractors Coor. Mtg., Mar. 1984, pp. 315-320.

A. B. Searle, R. W. Grimshaw, *The Chemistry and Physics of Clays and other Ceramic Materials*, Interscience Pub. Inc. 3rd Ed., pp. 512-513.

Primary Examiner—James Derrington
Attorney, Agent, or Firm—Carl F. Ruoff

[57] ABSTRACT

A method of producing crack free ceramic parts having large cross-sections is disclosed. An initial mixture of ceramic powder containing a binder and from 0.1 v/o to 10 v/o of whiskers or fibers which are made of carbon, graphite or high temperature melting or decomposition point organic polymers. The mixture is either injection molded or slip cast to form a shaped article. The shaped article is heated in a nitrogen atmosphere to a temperature of 450° C. and then in an atmosphere of air at a temperature of 450° C. to 600° C. to completely remove the binder. The resulting binderless shaped article is then heated at 800° C. for a period of time sufficient to completely remove the whiskers or fibers from the shaped articles. The article is then encapsulated in glass and hot isostatically pressed at a pressure of 30,000 psi to densify the article to approximately 99% of theoretical. The resulting article has a complex geometry and a large cross-section but without detrimental cracks.

26 Claims, No Drawings

METHOD OF MAKING LARGE CROSS SECTION INJECTION MOLDED OR SLIP CAST CERAMICS SHAPES

This application is a continuation-in-part of copending application Ser. No. 848,199, filed on Apr. 4, 1986 which application is now abandoned.

FIELD OF THE INVENTION

This invention relates to a method of making essentially crack free ceramic parts.

More particularly, this invention relates to a method of making essentially crack free large cross section injection molded or slip cast ceramic parts.

BACKGROUND OF THE INVENTION

Two methods of fabricating large cross section structural ceramic parts of complex shape (e.g. turbine engine rotors) are by an injection molding process or a slip casting process. In injection molding, a ceramic powder such as silicon nitride with the appropriate additives to promote densification and to impart the desired material properties is mixed with an organic binder in such a way that the mixture attains the properties of a thermoplastic material. It is then shaped by injection molding techniques and equipment well known in the plastics industry. The organic binder is removed by a thermal process involving liquification, pyrolysis and distillation. The resulting porous ceramic green body is densified by hot isostatic pressing or sintering.

The non-destructive removal of the organic binder however, remains the yield limiting step in the process. For successful densification by hot isostatic pressing or cold isostatic pressing followed by sintering, the parts must emerge from the binder removal step in an externally crack free condition. Internal flaws must be minimized in order to maintain dimensional tolerances. These conditions become more difficult to attain as the parts become larger in cross section and complexity. Lower yields of acceptable parts result.

In slip casting, a ceramic powder such as silicon nitride with the appropriate additives to promote densification and to impart the desired material properties is mixed with a liquid vehicle, typically water, dispersants and organic binder in such a way that the mixture attains a suitable low viscosity for pouring or pumping into a porous mold. The porous mold adsorbs excess liquid vehicle leaving a solid component of ceramic powder and binder, saturated with liquid vehicle in the spaces between ceramic particles. The component is removed from the mold and dried to remove the residual liquid vehicle. The organic binder is removed by a thermal process involving liquification, pyrolysis and distillation. The resulting porous ceramic green body is densified by hot isostatic pressing or sintering.

The non-destructive removal of the residual liquid vehicle in a hick cross section slip cast component requires a slow controlled drying cycle. For successful densification by hot isostatic pressing or cold isostatic pressing followed by sintering, the parts must emerge from the binder removal step in an externally crack free condition. Internal flaws must be minimized in order to maintain dimensional tolerances. These conditions become more difficult to attain as the parts become larger in cross section and complexity. Lower yields of acceptable parts result.

SUMMARY OF THE INVENTION

In accordance with one aspect of the present invention, a new and improved method for making an essentially crack free large cross section ceramic article comprises the following steps:

Step 1. A ceramic article injection molding formulation containing a binder is blended with from about 0.1 v/o to about 10 v/o short fibers to form a mixture.

Step 2. The mixture from Step 1 is injection molded to form a molded article.

Step 3. The binder from the molded article from Step 2 is removed to form a green body.

Step 4. The short fibers in the molded article from Step 3 are removed to form a final green body.

Step 5. The green body from Step 4 is densified to form an essentially crack free and undistorted densified ceramic article.

In accordance with another aspect of the present invention, a new and improved method for making an essentially crack free large cross section ceramic article comprises the following steps:

Step 1. A ceramic article slip casting formulation containing ceramic powder, liquid vehicle, dispersants and binder is blended with from about 0.1 v/o to about 10 v/o to short fibers to form a mixture.

Step 2. The mixture from Step 1 is slip cast to form a cast article.

Step 3 The liquid vehicle from the cast article from Step 2 is removed to form a dried green body.

Step 4. The binder from the molded article from Step 3 is removed to form a green body.

Step 5. The short fibers in the molded article from Step 4 are removed to form a final green body.

Step 6. The green body from Step 5 is densified by sintering or hot isostatic pressing to form an essentially crack free densified ceramic article.

OBJECTS OF THE INVENTION

Accordingly, it is an object of the present invention to provide a new and improved method of removing binder from an injection molded ceramic part having a large cross section thereby providing an injection molded crack free large cross section ceramic article. The method is also suitable for improving resistance to cracking during the drying stage of slip cast component fabrication.

The method involves the use of small amounts of short fibers which reinforce the component during the critical stages of injection molding binder removal or slip cast drying. The fibers used are then designed to be removed completely from the component prior to the onset of densification shrinkage, thus eliminating the tendency of whisker or fiber reinforced ceramic components to distort during densification.

DETAILED DESCRIPTION OF THE INVENTION

Ceramic powder/fiber compositions, which employ transient fiber reinforcements increase the quality and yield of large cross section parts of complex shapes through improvement of the binder removal or drying process step in a ceramic injection molding or slip casting process routing.

The fiber additions retard both internal and external crack formation during the binder removal or drying step thus producing higher yields and increased quality.

In general, cracks found in large cross section ceramic parts which have been shaped by injection molding or slip casting are associated with nonuniform shrinkage which occurs in the part due to powder particle rearrangement or migration as the binder is liquified and removed in injection molded components or as the residual liquid vehicle is removed from slip cast components during drying. The addition of relatively small amounts of fibers or whiskers, from about 0.1 to about 10 v/o, preferably from about 0.25 to about 5 v/o, to the powder utilized in the injection molding or slip casting process reduces or eliminates this cracking in two ways. The fibers or whiskers retard shrinkage by acting as reinforcing blocks to particle migration and impart a greater "green strength" to the part which reduces cracking (Table 1).

TABLE 1
RELATIVE GREEN STRENGTH OF
BURNED OUT INJECTION MOLDED BARS AS
A FUNCTION OF WHISKER CONCENTRATION

| Whiskers v/o | Modulus of Rupture (lb/sq in) |
| --- | --- |
| 2 | 335 |
| 5 | 510 |
| 10 | 757 |

Fiber or whisker additions which constitute from about 0.1 to about 10% of the volume of the ceramic powder contained in the injection molding feed stock have been shown to be effective without seriously compromising the molding process. Whiskers or fibers of materials carbon, graphite or high melting point or decomposition point organic polymers can be used. These fibers have diameters in the 5 to 10 micron range, and aspect ratios of 20 to 1000. Melt viscosity of the compounded mixture is increased proportionally to the concentration of fibers or whiskers added, but does not significantly interfere with the molding process. External cracking is eliminated, and internal cracking was reduced in injection molded test specimens and turbocharger sized test parts (Table 2).

TABLE 2
EXAMPLES OF IMPROVED BINDER REMOVAL

| Parts | Observations | Comparison |
| --- | --- | --- |
| Turbocharger sized test specimen (carbon fibers) four parts. | All externally crack free. | All controls without fibers showed external cracking. |
| Axial Inflow Turbine Rotor (carbon fibers) 4¼" tip to tip. | Nine of ten crack-free. | 50 controls without fibers showed external cracking. |
| Radial Inflow Turbine Rotor 4¼" tip to tip, part. | Externally crack-free part with significantly reduced internal cracking. | Severe External and internal cracking in controls without fibers. |

The injection molding process is described in more detail below. A feedstock containing milled ceramic powder, binder and fibers is compounded into an intimate mixture and granulated. The compounded material is injection molded into turbine rotor sized shapes having cross sections up to 1.5 inch utilizing a 200 ton injection molding machine. Granulated material is loaded into the injection chamber and heated to the molding temperature. Optimum molding temperature is usually just above the melting point of the binder composition. Where paraffin wax is the major binder component the chamber temperature is 70°–72° C. The die is maintained at or slightly above room temperature (20°–40° C.). Molding pressure must be sufficient to force the preheated mixture into all areas of the die. An injection pressure of 3,000 to 10,000 psi is adequate for molding these materials. The shot is injected into the die cavity and the pressure held for approximately one minute. The pressure is released, the die opened, and the part removed from the die.

The injection molded green turbocharger sized parts are embedded in a setter bed of ceramic powder to support the component during the binder removal thermal cycle.

The binder is partially removed from the molded parts by heating the embedded parts in a non-oxidizing environment such as nitrogen up to a temperature of 400° C. During initial heating at 10° C./hr or greater in which 15 w/o to 20 w/o of the binder is removed, the setter powder forms a thick cake around the part. The cake prevents further binder loss until the temperature is sufficiently high, approximately 400° C. up to 450° C., to break down the barrier by the thermal decomposition and vaporization of the binder. Thus, the majority of the binder loss occurs after a temperature of 400° C. is obtained and continues up to 450° C. The temperature of 450° C. is then raised to 600° C. and the heating is continued at 600° C. for up to 20 hours in an oxidizing environment such as air to remove the residual binder from the part. For turbine rotor sized test parts about 3 days of thermal treatment is sufficient to completely remove the binder. For larger than turbine rotor sized cross section parts a substantially lower heating rate, as low as 1° C./hr may be required or a total thermal treatment of approximately 17 days.

At this stage carbon or graphite fibers are still largely intact. To remove these fibers prior to densification the part is heated to approximately 700° to 800° C. in an oxidizing atmosphere such as air and held at that temperature for 2 to 20 hours depending on the grade of fiber used. The part is then cooled to room temperature.

Densification techniques such as sintering and HIPing can then be used to form a pure monolithic ceramic body.

An example of the properties obtained by this procedure are shown in Table 3. The PY6 formulation is a mixture of silicon nitride and 6% $Y_2O_3$ as a densification aid.

TABLE 3
STRENGTH OF INJECTION MOLDED
AND HIPED PY6 MATERIAL WHICH
CONTAINED 1 v/o CARBON FIBERS

| Composition (v/o Carbon Fibers in PY6) | 25° C. (KSI) | 1200° C. (KSI) | 1400° C. (KSI) |
| --- | --- | --- | --- |
| 0 | 140.0 | 95.0 | 61.1 |
| 1 | 155.1 | 100.6 | 60.7 |

Scanning electron microscopy of HIPed parts made using carbon fibers showed that the fibers could not be detected in the processed parts. The properties of the densified parts, however, were not affected by the presence of fibers, when used, which are removed at the final stage of the binder removal process. Thus, they have little effect on final microstructure and more importantly do not result in distortion of the component during densification.

Similar improvements in processing would be expected for slip cast components, allowing faster drying cycles or fewer flaws generated for an equivalent drying cycle when using fiber additions. In the case of slip cast components, the fibers would again be removed completely by heating at 700° to 800° C. in an oxidizing atmosphere, such as air, prior to densification.

EXAMPLE

A formulation of 6 w/o $Y_2O_3$ and the remainder $Si_3N_4$ powder is milled for about 6 to about 72 hours to obtain a ceramic feedstock powder.

The milled ceramic powder is compounded with about 34 v/o to about 42 v/o, preferably from about 37 v/o to about 40 v/o of a wax based binder such as 90 w/o paraffin wax, 5 w/o of surfactant, and 5 w/o of plasticizer and 1 v/o of graphite fiber. The graphite fibers have a nominal diameter of 5 microns and a chopped length of ⅛ inch. The compounding is done in a twin bladed dispersion mixer. The mixing chamber is heated to 70° C. Mixing is continued until the material has a creamy, homogeneous appearance.

The resulting mixture has rheological properties comparable to a thermoplastic material with a softening range of 40° to 75° C. It is pelletized or granulated according to well known techniques to a uniform granule size suitable as a feed material for injection molding apparatus.

An automotive gas turbine rotor is injection molded using the mixture containing the 1 v/o graphite fibers. The molded component is imbedded in a a setter powder and heated to 450° C. in a nitrogen atmosphere and then from 450° to 600° C. in an air atmosphere. A subsequent thermal cycle at 800° C. for 5 hours in an air atmosphere is used to remove the graphite fibers. The rotor made using the 1 v/o graphite fibers shows no externally detectable cracks. A companion sample made without the use of graphite fibers shows several external cracks after binder removal.

The rotor made using the graphite fibers is encased in a glass encapsulating agent and densified by hot isostatic pressing at 1825° C. and 30,000 psi pressure for a period of 90 minutes. The densified ceramic rotor is removed from the glass encapsulating agent.

The completed rotor has an immersion density of 99% of the theoretical value and shows no indication of densification distortion.

This new and improved method of obtaining essentially crack free large cross section ceramic parts, especially turbine engine parts, enhances the reliability of ceramic applications in the automotive industry which can decrease emission pollution by increased operating temperatures and increase fuel economy by the decreased weight associated with the ceramic parts compared to conventional metal components.

While there has been shown and described what is at present considered the preferred embodiment of the invention, it will be obvious to those skilled in the art that various changes and modifications may be made therein without departing from the scope of the invention.

What is claimed is:

1. A method for making an essentially crack-free large cross-section ceramic article comprising:

Step 1- blending a ceramic article injection molding formulation containing a ceramic powder and a binder with from about 0.25 v/o to about 5 v/o whiskers or fibers to form a mixture, said whiskers or fibers being selected from the group consisting of carbon, graphite, high temperature melting or decomposition point organic polymers and combinations thereof;

Step 2 - injection molding said mixture from step 1 to form a molded article;

Step 3 - heating said molded article from step 2 at a sufficient temperature and for a sufficient time to completely remove the binder to form a green body;

Step 4 - heating the green body from step 3 at a temperature of approximately 800° C. for a period of time sufficient to remove said whiskers or fibers;

Step 5 - densifying the green body from step 4 to form a ceramic article having a density greater than approximately 98% of theoretical.

2. The method according to claim 1 wherein said densifying comprises encapsulating the green body from step 4 and pressurizing the body at approximately 30,000 psi and a temperature of approximately 1825° C.

3. The method according to claim 1 wherein said ceramic powder comprises a silicon nitride based ceramic.

4. The method according to claim 3 wherein the silicon nitride based ceramic consists essential of silicon nitride and approximately 6% yttria.

5. The method according to claim 1 wherein said fibers or whiskers have a nominal diameter of approximately 5 microns and an aspect ratio of from about 20 to about 1000.

6. A method of making an essentially crack free large cross section ceramic article comprising the following steps:

Step 1 - blending a ceramic article slip casting formulation containing ceramic powder, liquid vehicle dispersants and binder with from about 0.5 v/o to about 5 v/o fibers or whiskers to form a mixture, said whiskers or fibers being selected from the group consisting of carbon, graphite, high temperature melting or decomposition point organic polymers, and combinations thereof;

Step 2 - slip casting said mixture from step 1 to form a cast article;

Step 3 - removing residual of said liquid vehicle in a drying step to form a dried cast article;

Step 4 - heating said dried cast article from step 3 at a sufficient temperature and for a sufficient time to remove the binder to form a green body;

Step 5 - heating the green body from step 4 at a sufficient temperature and a sufficient time to remove said whiskers or fibers;

Step 6 - densifying the green body from step 5 to form a ceramic article having a density of greater than 99% theoretical.

7. The method according to claim 6 wherein said densifying comprises encapsulating the green body from step 5 and pressurizing the body at approximately 30,000 psi at a temperature of approximately 1825° C.

8. The method according to claim 6 wherein said ceramic comprises a silicon nitride based ceramic.

9. The method according to claim 8 wherein the silicon nitride based ceramic consists essentially of silicon nitride and 6% yttria.

10. The method according to claim 6 wherein said whiskers or fibers have a nominal diameter of approximately 5 microns and an aspect ratio from about 20 to about 1000.

11. A method for making an essentially crack-free large cross-section ceramic article comprising:

Step 1 - blending a ceramic article injection molding formulation containing a ceramic powder and a binder with from about 0.5 v/o to about 5 v/o whiskers or fibers to form a mixture, said whiskers or fibers being selected from the group consisting of carbon, graphite, high temperature melting or decomposing point organic polymers and combinations thereof;

Step 2 - injection molding said mixture from step 1 to form a molded article;

Step 3 - heating said molded article from step 2 in a nitrogen atmosphere at a temperature of approximately 450° C. to partially remove the binder;

Step 4 - heating the green body from step 3 at a temperature of approximately 700° C. to 800° C. in a oxygen containing atmosphere for a period of time sufficient to completely remove the binder and to remove said whiskers or fibers;

Step 5 - encapsulating the green body from step 4 in glass and pressurizing the body at approximately 30,000 psi and at a temperature of approximately 1825° C. to from a ceramic article having a density of greater than 98% theoretical.

12. The method according to claim 11 wherein the ceramic powder comprises a silicon nitride based ceramic.

13. The method according to claim 12 wherein the silicon nitride based ceramic consists essentially of silicon nitride and 6% yttria.

14. The method according to claim 11 wherein the fibers or whiskers have a nominal diameter of approximately 5 microns and an aspect ratio from about 20 to about 1000.

15. A method for making an essentially crack-free large cross-section ceramic article comprising:

Step 1 - blending a ceramic article slip casting formulation containing ceramic powder, liquid vehicle dispersants and binder with from 0.25 v/o to about 5 v/o fibers or whiskers to form a mixture, said fibers or whiskers being selected from the group consisting of carbon, graphite, high temperature melting or composition point organic polymers and mixtures thereof;

Step 2 - slip casting the mixture of step 1 to form a cast article;

STep 3 - removing residual mixture to form a dried green body;

Step 4 - heating said cast article from step 3 in a nitrogen atmosphere at a temperature of approximately 450° C. to partially remove the binder;

Step 5 - heating the dried cast article from step 4 at a temperature of approximately 700° C. to 800° C. in an oxygen containing atmosphere for a period of time sufficient to remove said whiskers or fibers;

Step 6 - encapsulating the green body from step 5 in glass and pressurizing the body at approximately 30,000 psi and at a temperature of approximately 1825° C. to from a ceramic article having a density of greater than 98% theoretical.

16. The method according to claim 15 wherein the ceramic comprises a silicon nitride based ceramic.

17. The method according to claim 16 wherein the silicon nitride based ceramic consists essentially of silicon nitride and yttria.

18. The method according to claim 15 wherein the fibers or whiskers have a nominal diameter of approximately 5 microns and an aspect ratio from about 20 to about 1000.

19. A method for making an essentially crack-free large cross-section ceramic article comprising:

Step 1 - blending a ceramic article injection molding formulation containing a ceramic powder and a binder with from about 0.25 v/o to about 5 v/o whiskers or fibers to form a mixture, said whiskers or fibers being selected from the group consisting of carbon, graphite, high temperature melting or decomposing point organic polymers and combinations thereof;

Step 2 - injection molding said mixture from step 1 to form a molded article;

Step 3 - heating said molded article from step 2 in a nitrogen atmosphere at a temperature of approximately 450° C. to partially remove the binder;

Step 4 - heating the green body from step 3 at a temperature of approximately 700° C. to 800° C. in an oxygen containing atmosphere for a period of time sufficient to completely remove the binder and to remove said whiskers or fibers;

Step 5 - encapsulating the green body from step 4 in glass and pressurizing the body at approximately 30,000 psi and at a temperature of approximately 1825° C. to from a ceramic article having a density of greater than 98% theoretical.

20. The method according to claim 19 wherein the ceramic powder comprises a silicon nitride based ceramic.

21. The method according to claim 20 wherein the silicon nitride based ceramic consists essentially of silicon nitride and yttria.

22. The method according to claim 19 wherein the fibers or whiskers have a nominal diameter of approximately 5 microns and an aspect ratio from about 20 to about 1000.

23. A method for making an essentially crack-free large cross-section ceramic article comprising:

Step 1 - blending a ceramic article slip casting formulation containing ceramic powder, liquid vehicle dispersants and binder with from 0.25 v/o to about 5 v/o fibers or whiskers to form a mixture, said fibers or whiskers being selected from the group consisting of carbon, graphite, high temperature melting or composition point organic polymers and mixtures thereof;

Step 2 - slip casting the mixture of step 1 to form a cast article;

Step 3 - removing residual mixture to form a dried green body;

Step 4 - heating said cast article from step 3 in a nitrogen atmosphere at a temperature of approximately 450° C. to partially remove the binder;

Step 5 - heating said molded article from step 4 in air at a temperature of about 450° C. to 600° C. for a time sufficient to completely remove the binder to form a dried cast article;

Step 6 - heating the dried cast article from step 5 at a temperature of approximately 700° C. to 800° C. in an oxygen containing atmosphere for a period of time sufficient to remove said whiskers or fibers;

Step 7 encapsulating the green body from step 6 in glass and pressurizing the body at approximately 30,000 psi and at a temperature of approximately 1825° C. to from a ceramic article having a density of greater than 98% theoretical.

24. The method according to claim 23 wherein the ceramic comprises a silicon nitride based ceramic.

25. The method according to claim 14 wherein the silicon nitride based ceramic consists essentially of silicon nitride and yttria.

26. The method according to claim 23 wherein the fibers or whiskers have a nominal diameter of approximately 5 microns and an aspect ratio from about 20 to about 1000.

* * * * *